US012476364B2

(12) United States Patent
Odes

(10) Patent No.: US 12,476,364 B2
(45) Date of Patent: Nov. 18, 2025

(54) ULTRA WIDEBAND ANTENNA WITH PARTIAL CAP

(71) Applicant: GM GLOBAL TECHNOLOGY OPERATIONS LLC, Detroit, MI (US)

(72) Inventor: Uriel Zvi Odes, Givaat Shmuel (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 345 days.

(21) Appl. No.: 18/305,519

(22) Filed: Apr. 24, 2023

(65) Prior Publication Data

US 2024/0356218 A1 Oct. 24, 2024

(51) Int. Cl.
*H01Q 5/25* (2015.01)
*H01Q 1/36* (2006.01)
*H01Q 1/48* (2006.01)

(52) U.S. Cl.
CPC ................. *H01Q 5/25* (2015.01); *H01Q 1/36* (2013.01); *H01Q 1/48* (2013.01)

(58) Field of Classification Search
CPC .......... H01Q 9/0471; H01Q 1/36; H01Q 1/48; H01Q 5/25; H01Q 9/0421
See application file for complete search history.

(56) References Cited

U.S. PATENT DOCUMENTS 7,554,507 B2 * 6/2009 Kwon ...................... H01Q 9/26 343/866
7,742,003 B2 * 6/2010 Tseng ...................... H01Q 5/25 343/702
11,652,290 B2 * 5/2023 Odes ...................... H01Q 1/36 343/848
2004/0169609 A1 * 9/2004 Song ...................... H01Q 1/241 343/846
2006/0071865 A1 * 4/2006 Tang ...................... H01Q 1/243 343/702
2023/0053357 A1 * 2/2023 Odes ...................... H01Q 1/36
2023/0055236 A1 * 2/2023 Odes ...................... H01Q 9/40
2024/0356219 A1 * 10/2024 Odes ...................... H01Q 1/48
2024/0356220 A1 * 10/2024 Odes ...................... H01Q 9/40
2024/0356223 A1 * 10/2024 Odes ...................... H01Q 1/48
2025/0087883 A1 * 3/2025 Reneau ...................... H01Q 1/36
2025/0105529 A1 * 3/2025 Odes ...................... H01Q 13/18

FOREIGN PATENT DOCUMENTS

DE 102016207434 A1 * 10/2017 ............... H01Q 1/38

* cited by examiner

*Primary Examiner* — Dameon E Levi
*Assistant Examiner* — David Andrew Kubera

(57) ABSTRACT

A ultra wide band (UWB) antenna includes: a ground plane; and an antenna body including: a cap portion arranged above the ground plane; a tapered side portion extending perpendicular to the cap portion in a direction toward the ground plane, wrapping at least 50% around an outer edge of the cap portion and tapering in height from a feed side of the antenna body in a direction towards a back side of the antenna body; a cylinder connected to a bottom surface of the cap portion and to the ground plane; a connecting portion connecting the back side of the cap portion, opposite the feed side, to the ground plane; and an aperture through the cap portion disposed between the cylinder and the feed side of the antenna body.

20 Claims, 22 Drawing Sheets

FIG. 1A
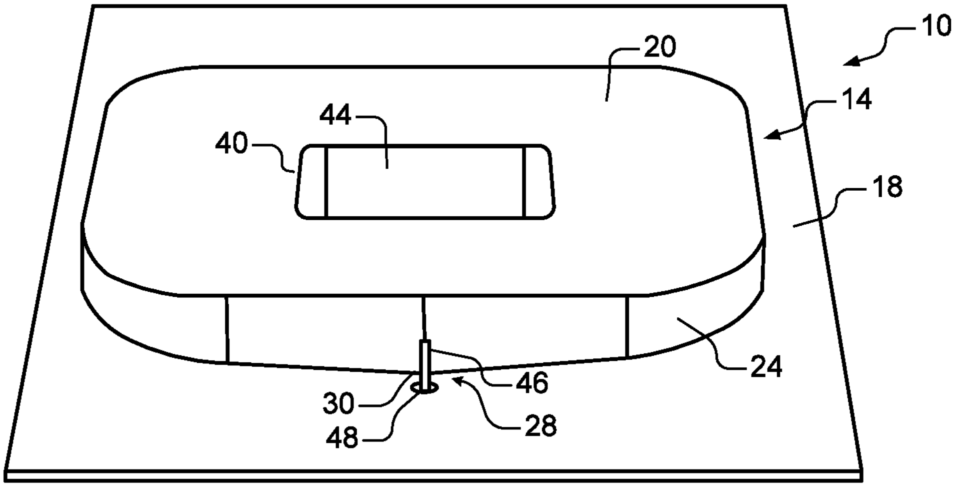
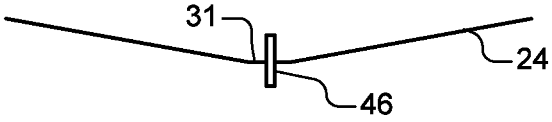
FIG. 1B
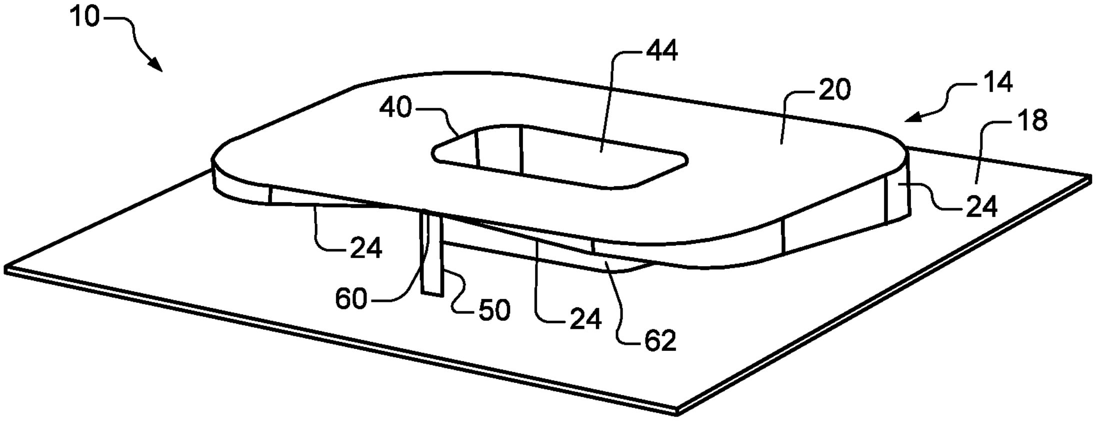
FIG. 2A

ULTRA WIDEBAND ANTENNA WITH PARTIAL CAP

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to antennas and more particularly to ultra wide band antennas.

Vehicles use telematics systems to support wireless telecommunications and information processing. Examples include cellular communications, global positioning system (GPS) navigation, integrated hands-free cell phones, wireless safety communication, vehicle to vehicle (V2V) communication, vehicle to infrastructure (V2I) communication, autonomous driving systems, etc.

The telematics systems transmit and receive data as the vehicle is driven on the road. To facilitate wireless connectivity, the vehicles include one or more antennas that are connected to transmitters and/or receivers of the telematics systems. Examples of antennas that may be used include mast antennas and shark fin antennas. Various sub-systems in the telematics systems transmit and receive on multiple different frequency bands. Ultra wide band (UWB) antennas may be a good candidate for cellular applications.

Manufacturers attempt to create cost-effective, fuel-efficient vehicles with attractive styling. Some antenna designs are typically not desirable from a styling viewpoint. For example, the shark fin antenna may be arranged on the roof of the vehicle above a middle of the rear windshield or on the rear deck lid. As can be appreciated, placing the shark fin antenna in those locations detracts from the external design of the vehicle. These types of antennas typically have a height that is approximately one quarter of a wavelength at a lowest desired operating frequency.

SUMMARY

In a feature, a ultra wide band (UWB) antenna includes: a ground plane; and an antenna body including: a cap portion arranged above the ground plane; a tapered side portion extending perpendicular to the cap portion in a direction toward the ground plane, wrapping at least 50% around an outer edge of the cap portion and tapering in height from a feed side of the antenna body in a direction towards a back side of the antenna body; a cylinder connected to a bottom surface of the cap portion and to the ground plane; a connecting portion connecting the back side of the cap portion, opposite the feed side, to the ground plane; and an aperture through the cap portion disposed between the cylinder and the feed side of the antenna body.

In further features, the aperture abuts an edge of the cylinder that faces the feed side.

In further features, the cylinder includes a second aperture through the cap portion.

In further features, a height of the antenna body relative to the ground plane is equal to approximately 1/20 of a wavelength corresponding to a lowest operating frequency of the UWB antenna.

In further features, the feed side of the tapered side portion has a first height and is spaced from the ground plane by a gap, wherein the back side of the tapered side portion has a second height that is less than the first height.

In further features, a height of the tapered side portion monotonically decreases from the first height to the second height.

In further features, the gap has a third height at the feed side of the tapered side portion and a fourth height at the back side of the tapered side portion, and the fourth height is greater than the third height.

In further features, a height of the gap monotonically increases from the third height to the fourth height.

In further features, the aperture is disposed closer to the feed side than to the back side.

In further features, an antenna feed is connected to a center of tapered side portion on the feed side.

In further features, a side wall of the cylinder is open to the aperture.

In further features, the aperture truncates the cylinder.

In further features, the cylinder includes a wall that tapers downwardly toward the feed side of the antenna body.

In further features, the antenna body is symmetrical about a line between (a) a first point on the feed side where an antenna feed connects to the feed side and (b) a second point on the back side where the connecting portion connects to the ground plane.

In further features, the cap portion includes: first cap portions disposed on opposite sides of the line; second cap portions disposed on opposite sides of the line; and third cap portions disposed on opposite sides of the line.

In further features, the third cap portions are planar and are parallel to the ground plane.

In further features, the first and second cap portions each include planar portions that are not parallel with the ground plane, where the planar portions of the first and second cap portions become further from the ground plane moving from the feed side of the antenna body toward the back side.

In further features, second apertures are through the first cap portions and disposed on opposite sides of the line.

In further features, second apertures are through the third cap portions and disposed on opposite sides of the line.

In further features, a vehicle includes the UWB antenna.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a perspective view of a feed side of an example of an ultra wide band (UWB) antenna arranged above a ground plane according to the present disclosure;

FIG. 1B is a side view illustrating another example of the tapered side portion near the feed point according to the present disclosure;

FIGS. 2A to 2C are perspective views of examples of a back side of the UWB antenna of FIGS. 1A and 1B;

In the drawings, reference numbers may be reused to identify similar and/or identical elements.

DETAILED DESCRIPTION

Figure 2B:
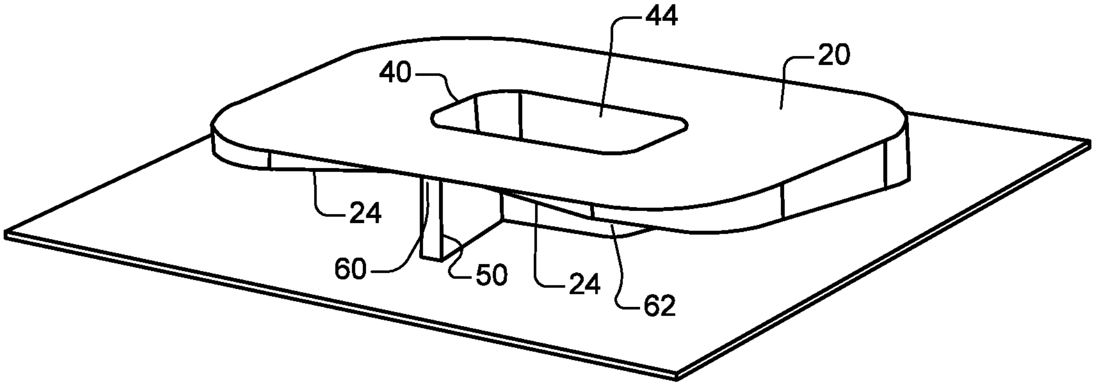

An ultra wide band (UWB) antenna according to the present disclosure has an extremely low profile, which allows the UWB antenna to be incorporated into a variety of different locations. The extremely low profile allows the UWB antenna to be placed in less noticeable internal or external vehicle locations. For example, the UWB antenna can be concealed in a cavity in the roof below a non-conducting roof material and above a conducting plane (which may be the same as or different than the ground plane of the antenna), which improves the exterior design of the vehicle.

The conductive cap of a UWB antenna provides coupling between the antenna and a ground plane and assists operation in low frequencies. The present application involves a UWB antenna with a partial cap-a cap that covers only a partial top surface of the UWB antenna. In other words, one or more apertures are formed through the cap. This decreases production complexity of the UWB antenna and decreases mass of the UWB antenna while achieving at least equal performance as a UWB antenna with a complete cap.

Referring now to FIGS. 1A to 2C, an example UWB antenna 10 is shown. In FIG. 1A, the UWB antenna 10 includes an antenna body 14 that is arranged above a ground plane 18. Somewhat different than the examples discussed further below, the antenna body 14 includes a planar portion 20 and a tapered side portion 24 that extends from a bottom surface of the planar portion 20 towards the ground plane 18. In some examples, the planar portion 20 has a rounded rectangular shape, an elliptical shape or a circular shape.

In some examples, an opening 40 is formed in the planar portion 20 and has a shape that is similar to a shape of the outer edge of the planar portion 20, although other shapes can be used. For example, the opening 40 may have a rounded rectangular shape, an elliptical shape or a circular shape.

In some examples, the opening 40 is centered relative to the planar portion 20. If the opening 40 is used, an upper edge of a cylinder 44 is connected to a bottom surface of the planar portion 20 at the opening 40 and a lower edge of the cylinder 44 is connected to the ground plane 18. In other examples, the opening 40 can be omitted. If the opening 40 is omitted, a top portion of the cylinder 44 can be attached to a bottom surface of the planar portion 20.

In some examples, the cylinder 44 is a rounded rectangular cylinder, an elliptical cylinder or a circular cylinder. In some examples, the cross-sectional shape and size of the cylinder 44 matches a shape of the opening 40. The cylinder 44 is connected to the bottom surface of the planar portion 20 along an edge of the opening 40 or radially outside of the opening 40 to provide electrical continuity between the planar portion 20 and the cylinder 40.

In some examples, the tapered side portion 24 is connected at or near the outer edge of the planar portion 20 and wraps fully around the outer edge of the planar portion 20. In other examples, the tapered side portion 24 is connected at or near the outer edge of the planar portion 20 and wraps around greater than or equal to 90% of the edge of the planar portion 20. In still other examples, the tapered side portion 24 wraps around at least 50% of the outer edge of the planar portion (or at least 25% at or near the outer edge of the planar portion in both directions when starting from the antenna feed on the feed side).

The tapered side portion 24 has a height that varies around the outer edge of the planar portion 20. In the example of FIG. 1A, the height of the tapered side portion 24 decreases or tapers from a center 30 of the tapered side portion 24 on the feed side shown in FIG. 1A (where the tapered side portion 24 has its greatest height) to a location at or near a center 60 of the tapered side portion 24 on the back side shown in FIG. 2A (where the tapered side portion 24 has its shortest height). In other words, the gap between the lower edge of the tapered side portion 24 and the ground plane 18 varies. A vertical height of the gap increases from the center 30 of the tapered side portion 24 on the feed side shown in FIG. 1A to a location at or near the center 60 of the tapered side portion 24 on the back side shown in FIG. 2A where the gap has a largest vertical height.

Figure 2C:
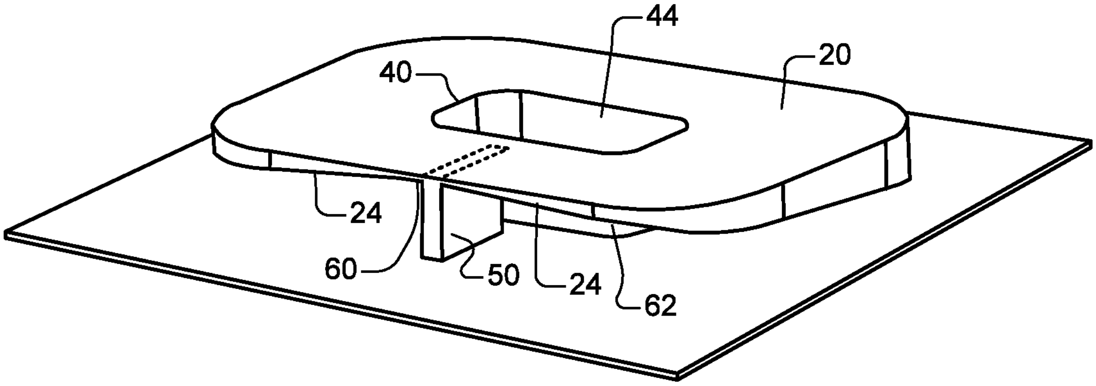

In some examples, the height of the tapered side portion 24 tapers fully at the center 60 as shown in FIG. 2A. In other examples, the tapered side portion 24 does not taper fully at the center as shown in FIG. 2C. Alternatively, the tapered side portion 24 tapers from a center 30 on the feed side shown in FIG. 1 and ends prior to reaching the center 60 as shown in FIG. 2B. In some examples, the height of the tapered side portion 24 monotonically decreases.

The antenna body 14 is mounted to the ground plane 18 and a gap 28 is defined between the center 30 of the tapered side portion 24 on the feed side and the ground plane 18. In some examples, an antenna feed 46 extends through an opening 48 formed in the ground plane 18 and is connected to the antenna body 14 at the center 30 of the feed side. For example only, the antenna feed 46 can include an inner conductor of a coaxial cable and a woven copper shield (not shown) of the coaxial cable can be connected to the ground plane 18. The inner conductor of the coaxial cable may serve as the antenna feed 46 and be electrically connected to the antenna body 14. While a specific type of antenna feed is shown for illustration purposes, the antenna can be fed using other antenna feed arrangements. For example, rather than passing perpendicular through the ground plane, the antenna feed can be arranged and connected to the antenna body at the feed location parallel to and above the ground plane (and not pass through the ground plane).

In FIG. 1B, the tapered side portion 24 can optionally taper downwardly adjacent to the feed location and then transition to a non-tapered section 31 at the antenna feed location. In some examples, a transition between the tapered side portion 24 and the non-tapered section 31 can be rounded. In some examples, a lower edge of the non-tapered section 31 is arranged parallel to the ground plane. In some examples, the non-tapered section 31 has a horizontal width in range from 0.5 mm to 20 mm, although other widths may be used. The horizontal width of the non-tapered section 31 and the height of the gap 28 can be varied to influence the impedance of the UWB antenna at the antenna feed point.

The planar portion 20 lies in a plane that is generally parallel to and spaced above the ground plane 18. A connecting portion 50 is located on a back side of the antenna body 14 to connect the planar portion 20 and/or the tapered side portion 24 to the ground plane 18. In some examples, the connecting portion 50 includes a conducting portion that connects the planar portion 20 to the ground plane 18 but does not extend to the cylinder 44 (FIG. 2A). In other examples, the connecting portion 50 includes a conducting wall portion having a generally rectangular cross-section (in a radial direction of the planar portion 20). If the conducting wall is used, the connecting portion 50 is attached to a lower surface of the planar portion 20 near the center 60 of the planar portion 20 and extends fully (in FIG. 2B) or partially (FIG. 2C) to an outer surface 62 of the cylinder 44.

The antenna body 14 can be made entirely of an electrically conductive material such as a metal. Alternately, one or more portions of the antenna body 14 can include a supporting surface that is made of a non-conducting material and a layer made of a conducting material attached to, deposited on, or printed on the non-conducting material.

Without committing to a theory of operation, the UWB antennas described herein operate like a cavity-backed slotted antenna with opposite ends and the cavity wrapped around and connected together.

Some antenna designs may involve a height of the UWB antenna to be at least approximately one quarter (¼) of the wavelength corresponding to a lowest target operating frequency of the UWB antenna 10. In some examples, the UWB antennas discussed herein can be designed with a vertical height that is as low as approximately 1⁄20th of a wavelength corresponding to the lowest target operating frequency. As used herein, approximately 1⁄20th of a wavelength may refer to 4% to 6% of the wavelength corresponding to the lowest desired operating frequency. When height is less of a concern, the UWB antenna 10 can be designed with other vertical heights such as 1⁄10th of a wavelength corresponding to the lowest target operating frequency or other heights. Vertical height may refer to the distance between the ground plane and the vertical top most portion of the UWB antenna.

For example, the UWB antenna can be designed for 1.7 GHZ applications and can have a height of approximately 8-9 millimeters (mm). In some examples, the width W and length L of the UWB antenna is in a range from 0.5 to 5 times the height H of the UWB antenna. In some examples, the ground plane is wider than the L and W of the antenna body by first and second predetermined distances, respectively. The first and second predetermined distances are the same (symmetric) or different (asymmetric).

The UWB antenna 10 has a low profile. The relatively low height of the UWB antenna (e.g. approximately 1⁄20*wavelength) provides a significant advantage when attempting to locate the UWB antenna in unobtrusive locations to enhance the design and visual appearance of the vehicle. The increased height of other antennas makes it more difficult to locate in or on a vehicle without adversely impacting the design of the vehicle or reducing headroom when located between the headliner and roof.

For example only, the UWB antenna 10 may be designed for 617 megahertz (MHz) applications and can handle a first frequency band from 617 MHz to 960 MHZ, a second frequency band from 1.7 gigahertz (GHz) to 2.7 GHZ and a third frequency band from 3.3 GHz to 6 GHZ, although other frequencies ranges may be used.

In the UWB antenna 10 shown in FIGS. 1A to 2C, the UWB antenna 10 is arranged above the ground plane 18. In this design, the ground plane 18 may act similar to a mirror and reflect signals emitted by the UWB antenna 10.

Figure 3:
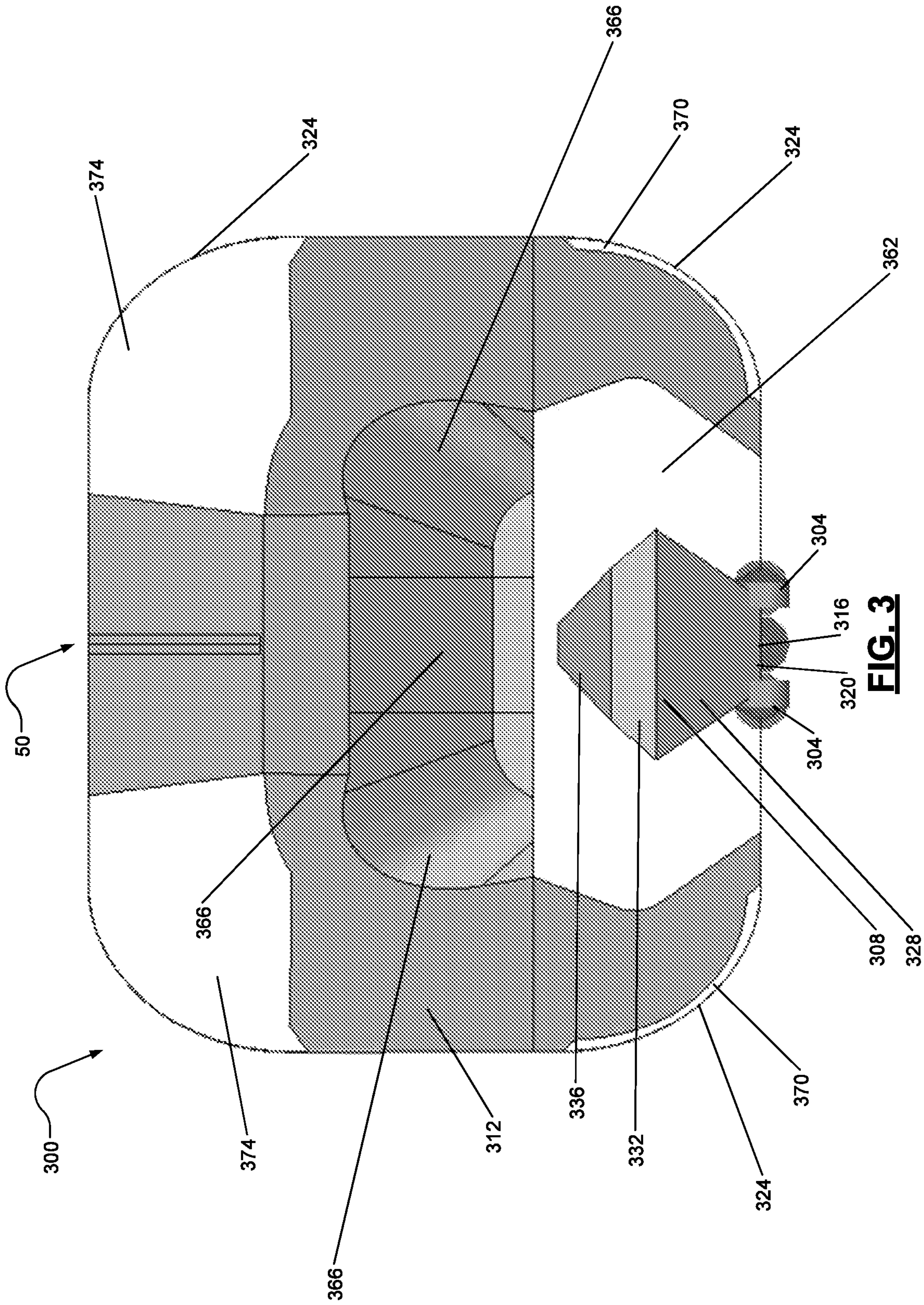
FIGS. 3-13 are example views of a UWB antenna including multiple different antennas and integrated radio frequency (RF) filters.
Figure 4:
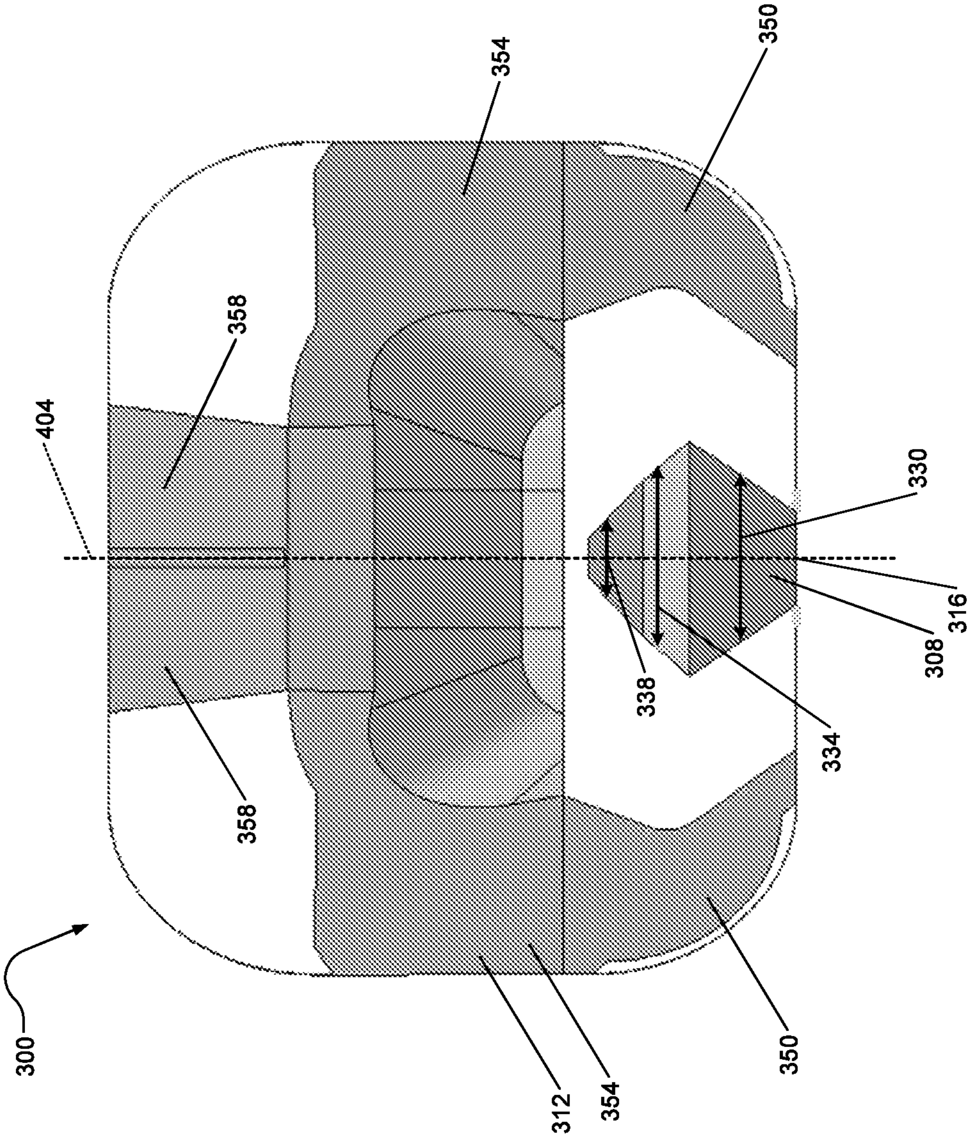

FIGS. 3 and 4 are top views of an example implementation of a UWB antenna 300 of the present application including multiple different antennas. FIG. 4 illustrates the UWB antenna 300 without filters 304.

Figure 5:
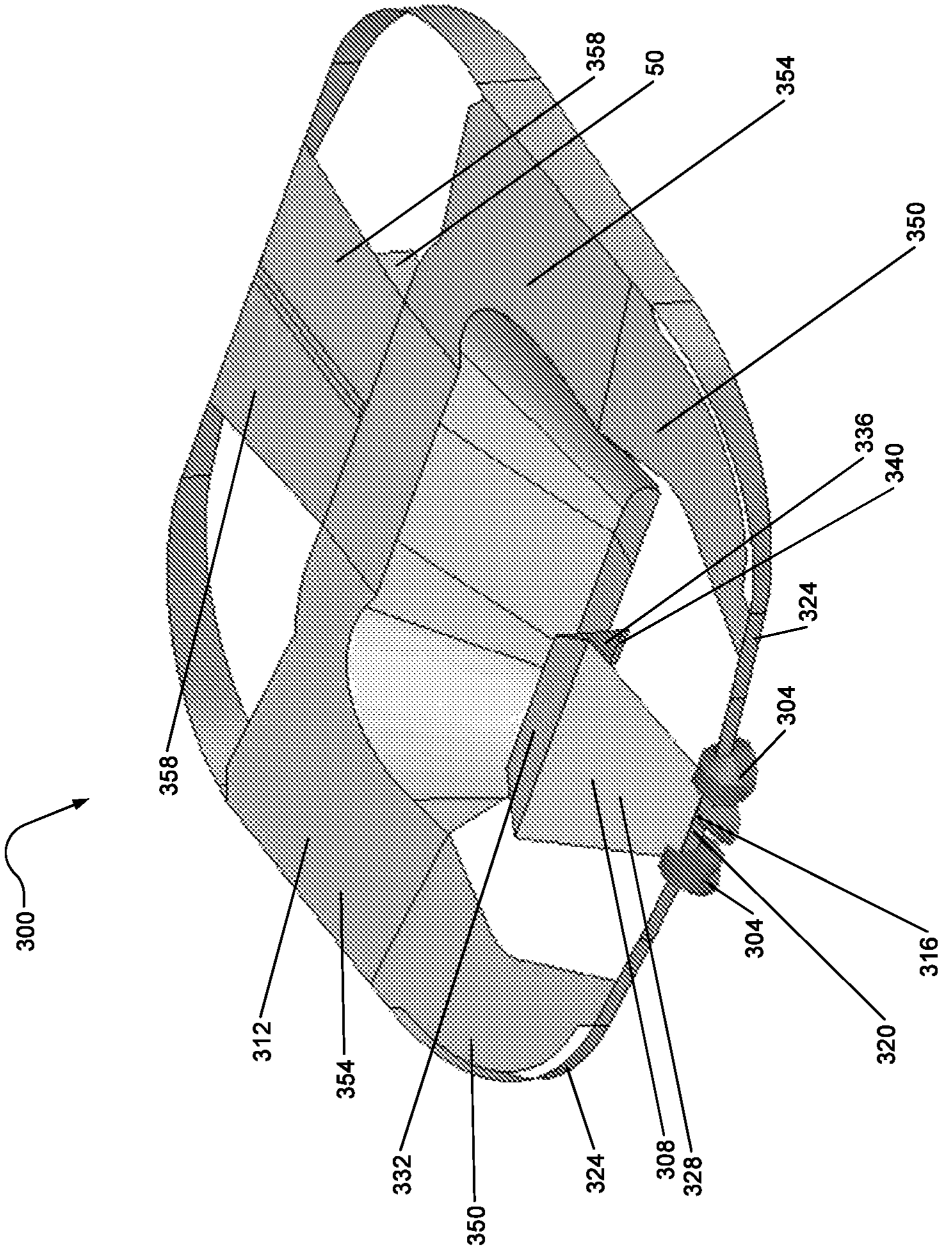
Figure 6:
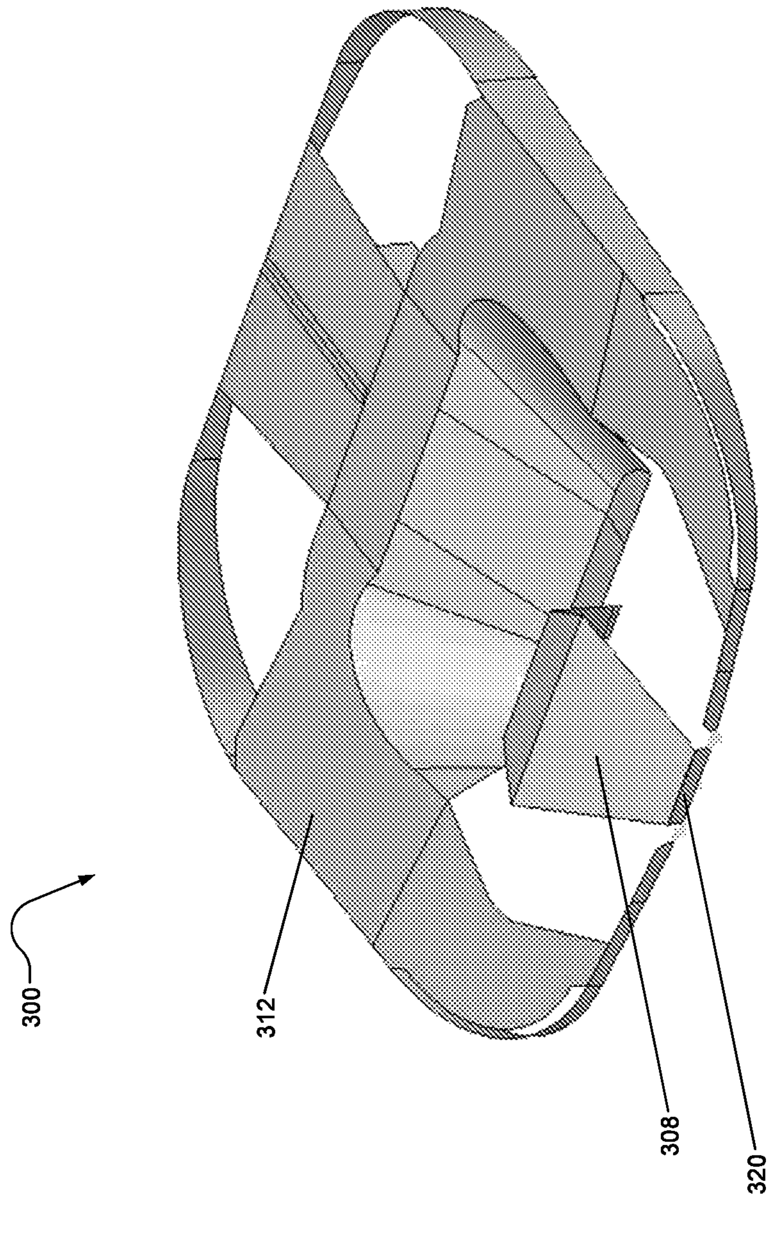

FIGS. 5 and 6 are side perspective views of the example implementation of the UWB antenna 300 of the present application. FIG. 6 illustrates the UWB antenna 300 without the filters 304.

Figure 7:
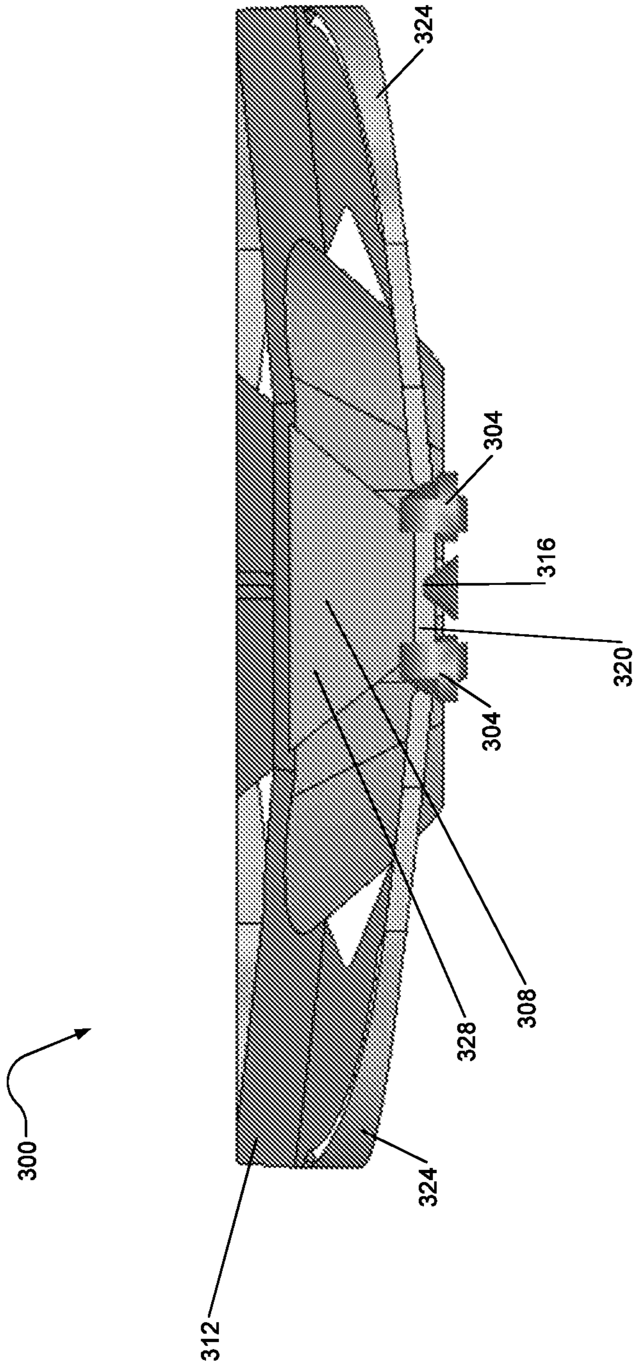
Figure 8:
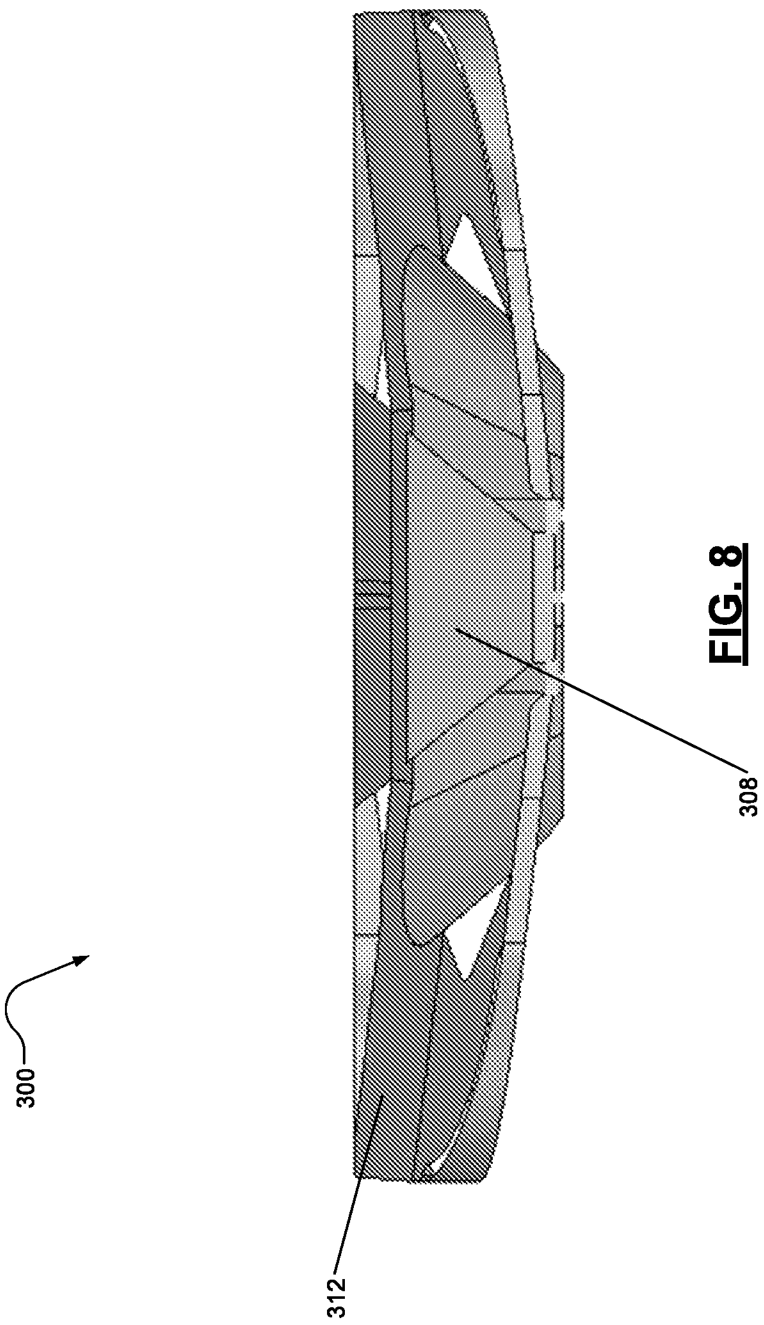

FIGS. 7 and 8 are front perspective views of the example implementation of the UWB antenna 300 of the present application toward the feed side. FIG. 8 illustrates the UWB antenna 300 without the filters 304.

Figure 9:
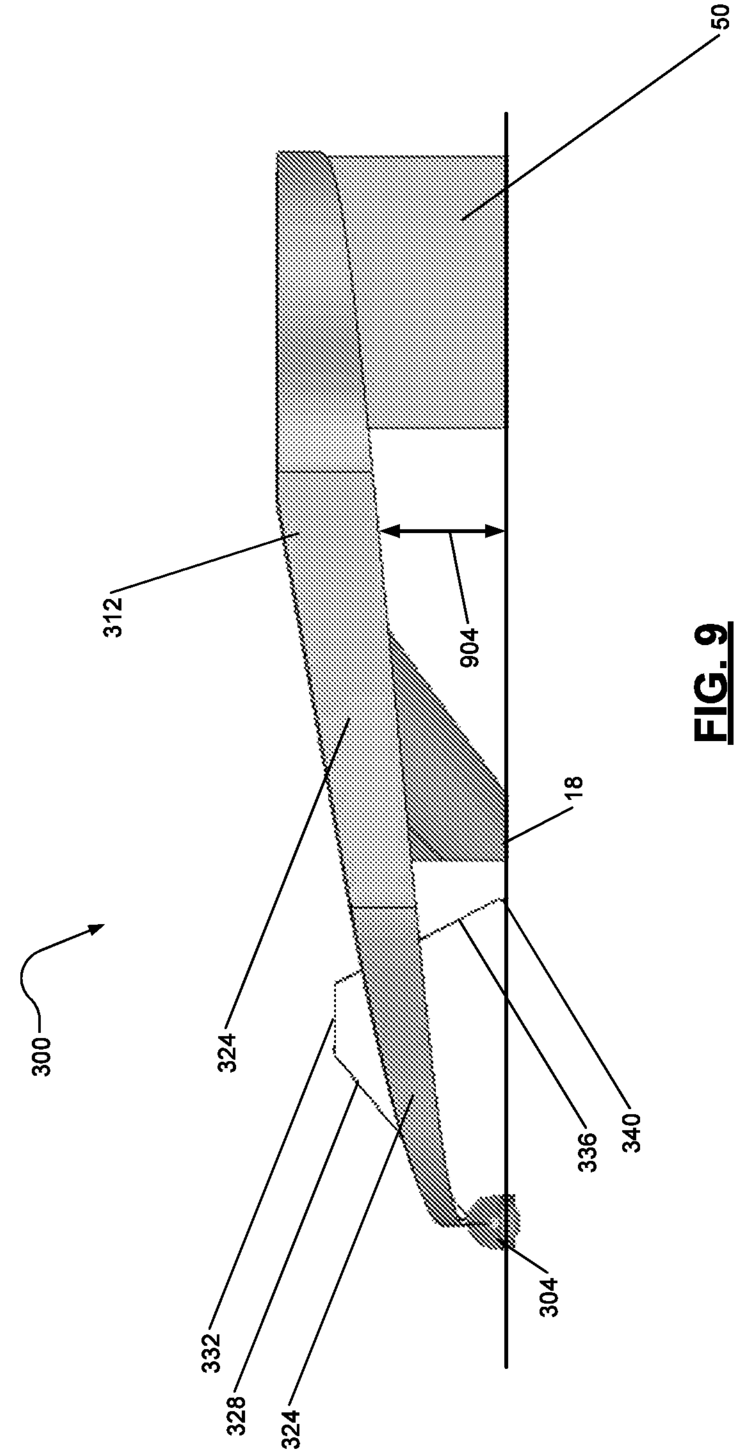
Figure 10:
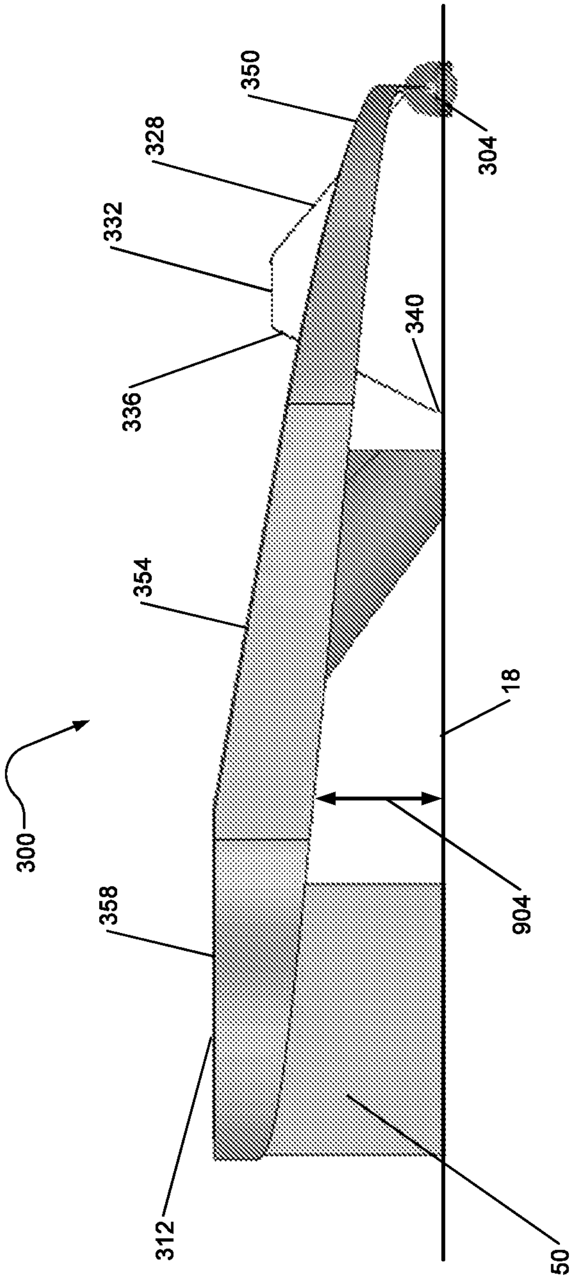

FIG. 9 is a side perspective view of the example implementation of the UWB antenna 300 of the present application from the right side of the antenna relative to the feed side (of FIGS. 7 and 8). FIG. 10 is a side perspective view of the example implementation of the UWB antenna 300 of the present application from the left side of the antenna relative to the feed side (of FIGS. 7 and 8). The left side is opposite the right side.

Figure 11:
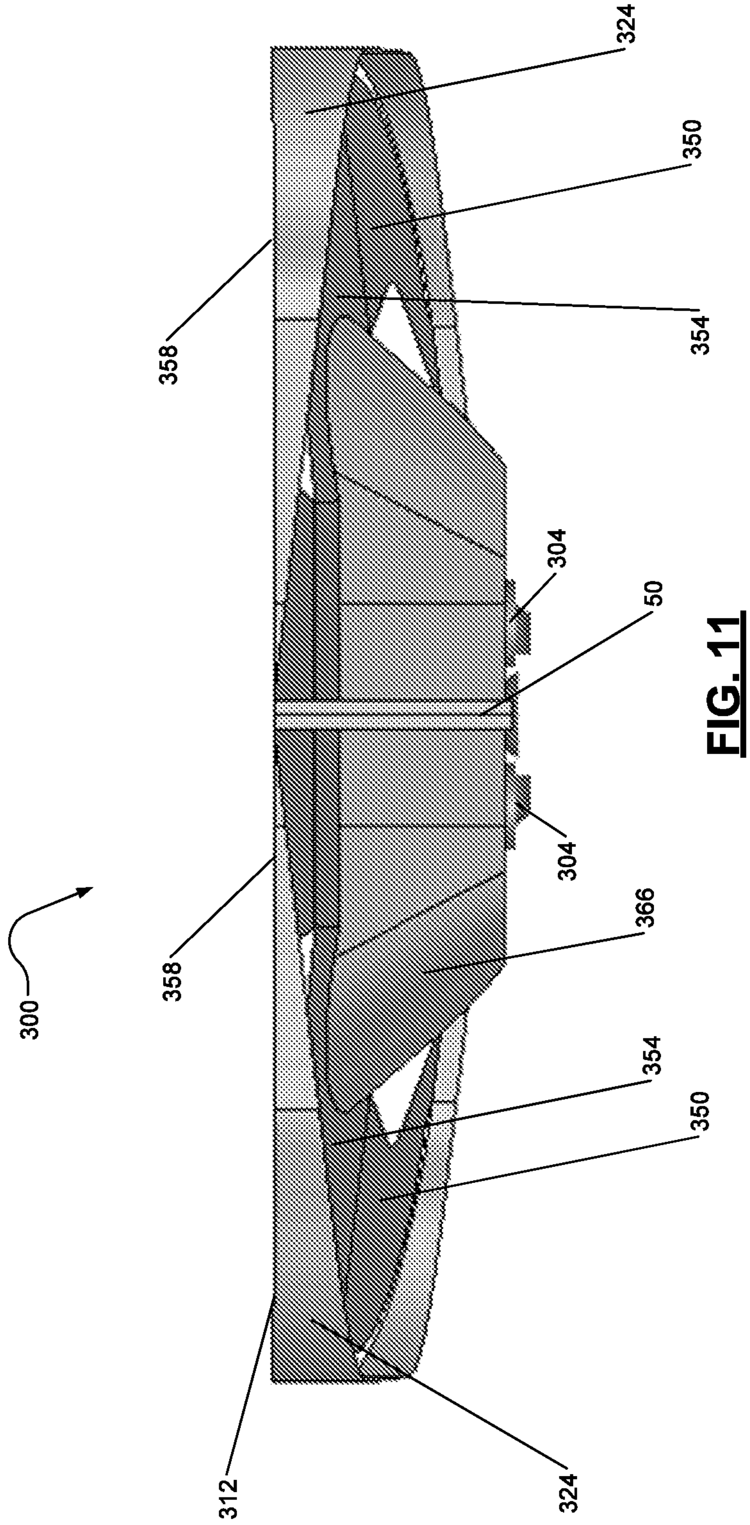
Figure 12:
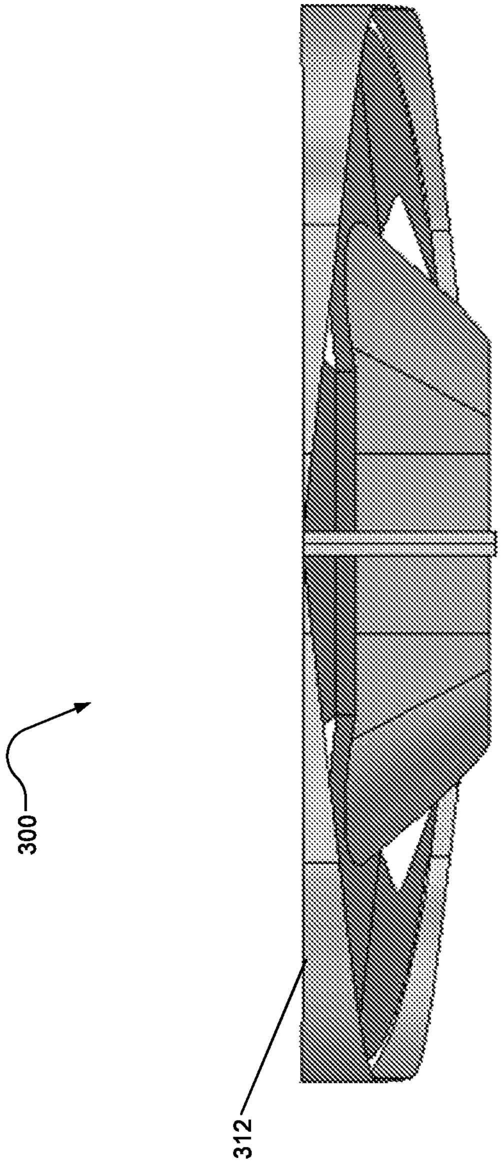

FIGS. 11 and 12 are rear perspective views of the example implementation of the UWB antenna 300 of the present application toward the rear/back side. FIG. 12 illustrates the UWB antenna 300 without the filters 304. The rear side is opposite the front/feed side of FIGS. 7 and 8.

Referring to FIGS. 3-12, the UWB antenna 300 includes a first antenna 308 and a second antenna 312. The first antenna 308 has a first operating frequency range, such as from 1.7 gigahertz (GHz) to 6 GHZ, although other frequency ranges may be used. The second antenna 312 has a second operating frequency range that may not overlap, partially overlap, or overlap the first frequency operating frequency range. For example only, the UWB antenna 10 may be designed for 617 megahertz (MHz) applications and can handle a first frequency band from 617 MHz to 960 MHZ, 1.7 GHZ to 6 GHZ, or another suitable frequency range. The second operating frequency range (band) may be at least partially lower than the first operating frequency range.

A multiplexer could be connected to each of the first and second antennas 308 and 312 via to separate radio frequency (RF) lines. This is different than the UWB (e.g., 300) of the present application. The present application involves a single UWB that includes the two (first and second) antenna portions that are both connected to a single RF feed 316. In the example of FIGS. 3-12, the filters 304 filter signals between the feed 316 and the second antenna 312. This is a volume/surface space saving design that combines multiple antennas which are dedicated to different frequency bands. The UWB 300 saves packaging space. Additionally, less RF lines are needed relative to the use of a multiplexer connected to two antennas. A cost reduction is also achieved via use of the single UWB 300 instead of two separate antennas.

As shown in FIGS. 5-8, the feed 316 is electrically connected to a distribution portion 320. The distribution portion 320 extends away from the ground plane 18 and may be perpendicular to the ground plane 18. The feed 316 may be at a horizontal center of the distribution portion 320.

The first and second antennas 308 and 312 are electrically conductive and may be made of a metal. The distribution portion 320 may be directly electrically connected to the first antenna 308. The distribution portion 320 may be part of the first antenna 308.

Figure 13:
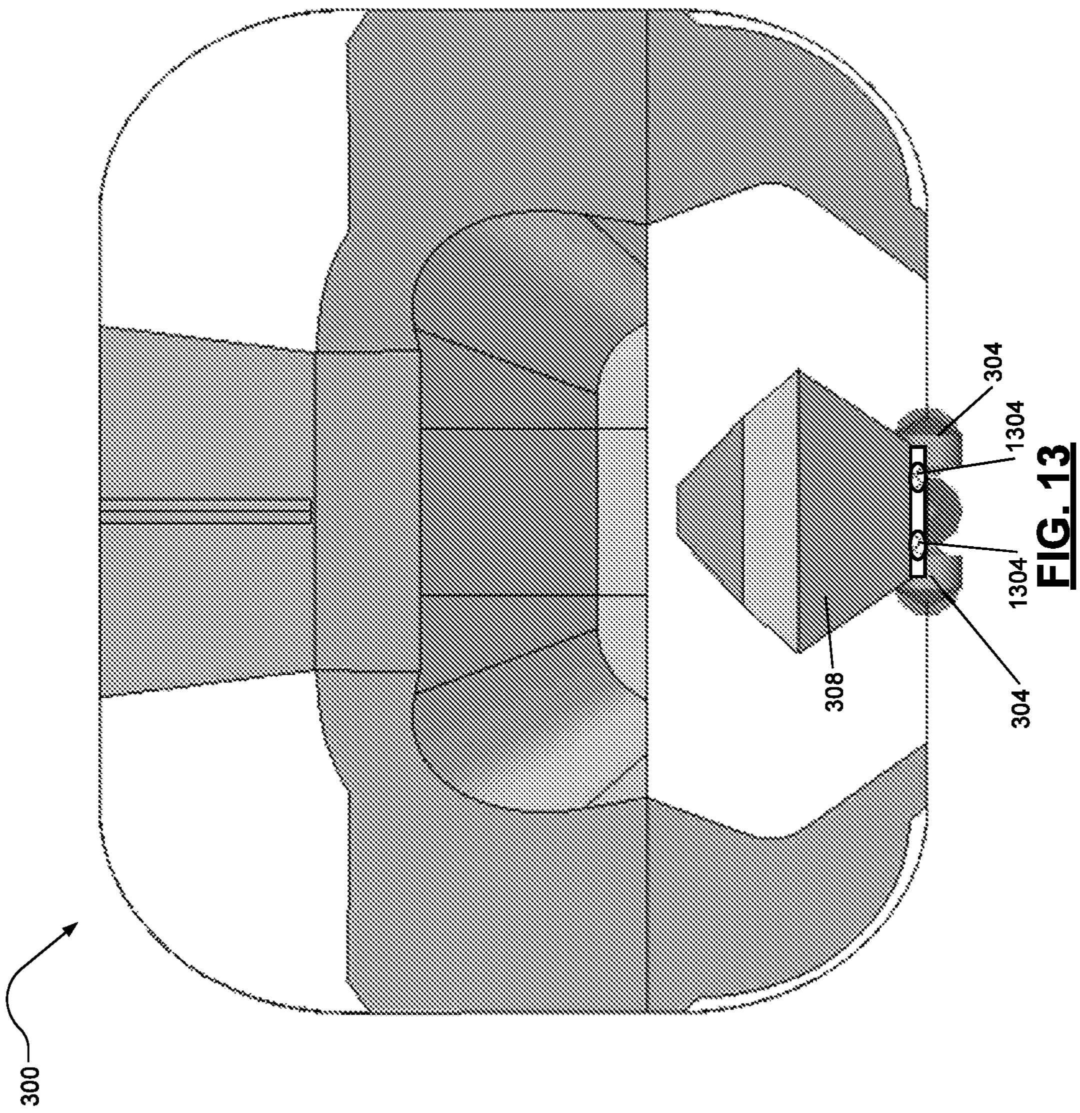

The second antenna 312 is electrically connected to the distribution portion 320 via the filters 304. The filters 304 may include, for example, one or more inductors, one or more capacitors, and/or one or more resistors. In the examples of FIG. 13, which is a top view of the UWB antenna 300, the first antenna 308 is electrically connected to the distribution portion via filters 1304. The filters 304 may be low pass filters which block signals within the first predetermined frequency band. The filters 1304 may be high pass filters which block signals within the second predetermined frequency band.

Figure 14:
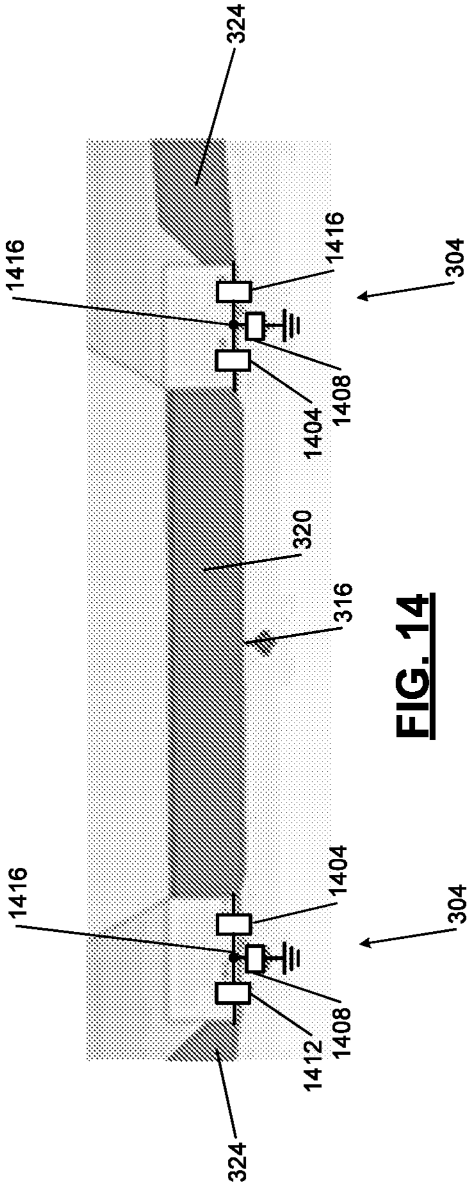
FIGS. 14-15 are views of example implementations of the RF filters.

FIG. 14 includes a combination front and schematic view of an example implementation of the filters 304. The filters 304 may be T type filters including a first filter component 1404, a second filter component 1408, and a third filter component 1412. The first filter component 1404 may be an inductor, a capacitor, or a resistor. The second filter component 1408 may be an inductor, a capacitor, or a resistor. The third filter component 1412 may be an inductor, a capacitor, or a resistor.

The first filter component 1404 is electrically connected between the distribution component 320 and a node 1416. The second filter component 1408 is electrically connected between the node 1416 and the ground plane 18. The third filter component 1412 is electrically connected between the node 1416 and the tapered side portion 324 of the second antenna 312.

Figure 15:
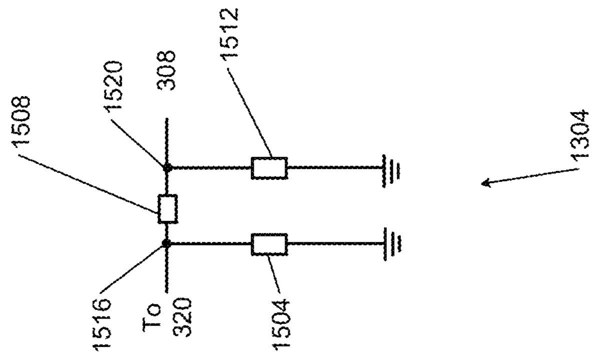

FIG. 15 includes a schematic view of an example implementation of one of the filters 1304. The filters 1304 may be identical. The filters 1304 may be π type filters including a first filter component 1504, a second filter component 1508, and a third filter component 1512. The first filter component 1504 may be an inductor, a capacitor, or a resistor. The second filter component 1508 may be an inductor, a capacitor, or a resistor. The third filter component 1512 may be an inductor, a capacitor, or a resistor.

The first filter component 1504 is electrically connected between a node 1516 that is electrically connected to the distribution portion 320 and the ground plane 18. The second filter component 1508 is electrically connected between the node 1516 and a node 1520 that is electrically connected to first antenna 308. The third filter component 1512 is electrically connected between the node 1520 and the ground plane 18.

Referring back to FIGS. 3-12, the first antenna 308 includes a first portion 328 that is planar and that extends vertically upwardly away from the distribution portion 320 and the ground plane 18. The drawings provided herein may be to scale. The first portion 328 may be non-perpendicular to the ground plane 18 and non-perpendicular to the distribution portion 320.

The first antenna 308 includes a second portion 332 that is planar and that extends vertically downwardly toward the ground plane 18. The second portion 332 is connected to the first portion 328. The second portion 332 may be non-perpendicular to the first portion 328. In various implementations, the plane of the second portion 332 may be parallel to the ground plane 18, such as illustrated in the example of FIG. 9. As shown in FIG. 4, a width 330 of the first portion 328 may increase moving toward the second portion 332 and away from the distribution portion 320.

The first antenna 308 includes a third portion 336 that is planar and that extends vertically downwardly toward the ground plane 18. The third portion 336 is connected to the second portion 332. The third portion 336 may be non-perpendicular to the second portion 332. As shown in FIG. 4, a width 334 of the second portion 332 may decrease moving toward the third portion 336 and away from the first portion 328.

The first antenna 308 includes a fourth portion 340 that is planar and that extends vertically downwardly and directly contacts the ground plane 18. The fourth portion 340 may be perpendicular to the ground plane 18. The fourth portion 340 is connected to the third portion 336. As shown in FIG. 4, a width 338 of the third portion 336 may decrease moving toward the fourth portion 340 and away from the second portion 332.

The second antenna 312 includes a cap that includes first cap portions 350, second cap portions 354, and third cap portions 358. The first and second cap portions 350 and 354 may extend vertically upwardly and away from the ground plane 18. Planes of the third cap portions 358 may be parallel to the ground plane 18, such as illustrated in FIGS. 9 and 10.

The connecting portion 50 is located on the back side of the UWB 300 (opposite the feed 316) and connects the second antenna 312 and/or the tapered side portion 324 to the ground plane 18. As illustrated in FIG. 4, the first and second antennas 308 and 312 are symmetric about a line/plane 404 and the feed 316.

The second antenna 312 includes an aperture 362. The aperture 362 may be defined by the first cap portions 350, the second cap portions 354, and a tapered portion 366 that tapers vertically towardly from the second cap portions 354 toward or to the ground plane 18. The first antenna 308 is disposed within the aperture 362. In various implementations, such as shown in FIGS. 9 and 10, the tapered portion 366 may extend to and contact the ground plane 18.

The second antenna 312 may also include apertures 370 formed between outer edges of the first cap portions 350 and the adjacent tapered side portions 324. The second antenna 312 may also include apertures 374 through the third cap portions 358. In various implementations, the apertures 370 and/or the apertures 374 may be omitted and the cap portions may be solid to the adjacent tapered side portion 324.

The tapered side portion 324 extends vertically downwardly toward the ground plane 18. The tapered side portion 324 may be perpendicular to the ground plane 18.

In some examples, the tapered side portion 324 wraps fully around the UWB antenna 300 from the feed 316 to the connecting portion 50. The tapered side portion 324 has a vertical height that varies around the UWB antenna 300. In the example of FIG. 9, the height of the tapered side portion 324 increases adjacent to the front cap portions 350 moving away from the feed 316 toward the connecting portion 50. The height of the tapered side portion 324 may also increase adjacent to the second cap portions 350 moving away from the feed 316 toward the connecting portion 50. The height of the tapered side portion 324 may also decrease adjacent to the third cap portions 358 moving away from the feed 316 toward the connecting portion 50.

As illustrated in FIGS. 9 and 10, a vertical gap 904 between a lower most edge of the tapered side portion 324 and the ground plane 18 may increase moving away from the feed 316 toward the connecting portion 50. In various implementations, the vertical cap 904 may increase monotonically moving away from the feed 316 and toward the connecting portion 50. A vertical height of the gap increases from a center of the tapered side portion 324 on the feed side shown in FIG. 7 (where the vertical gap is a smallest vertical height) to a location at or near the center of the tapered side portion 324 on the back side shown in FIG. 11 where the gap has a largest vertical height.

Figure 19:
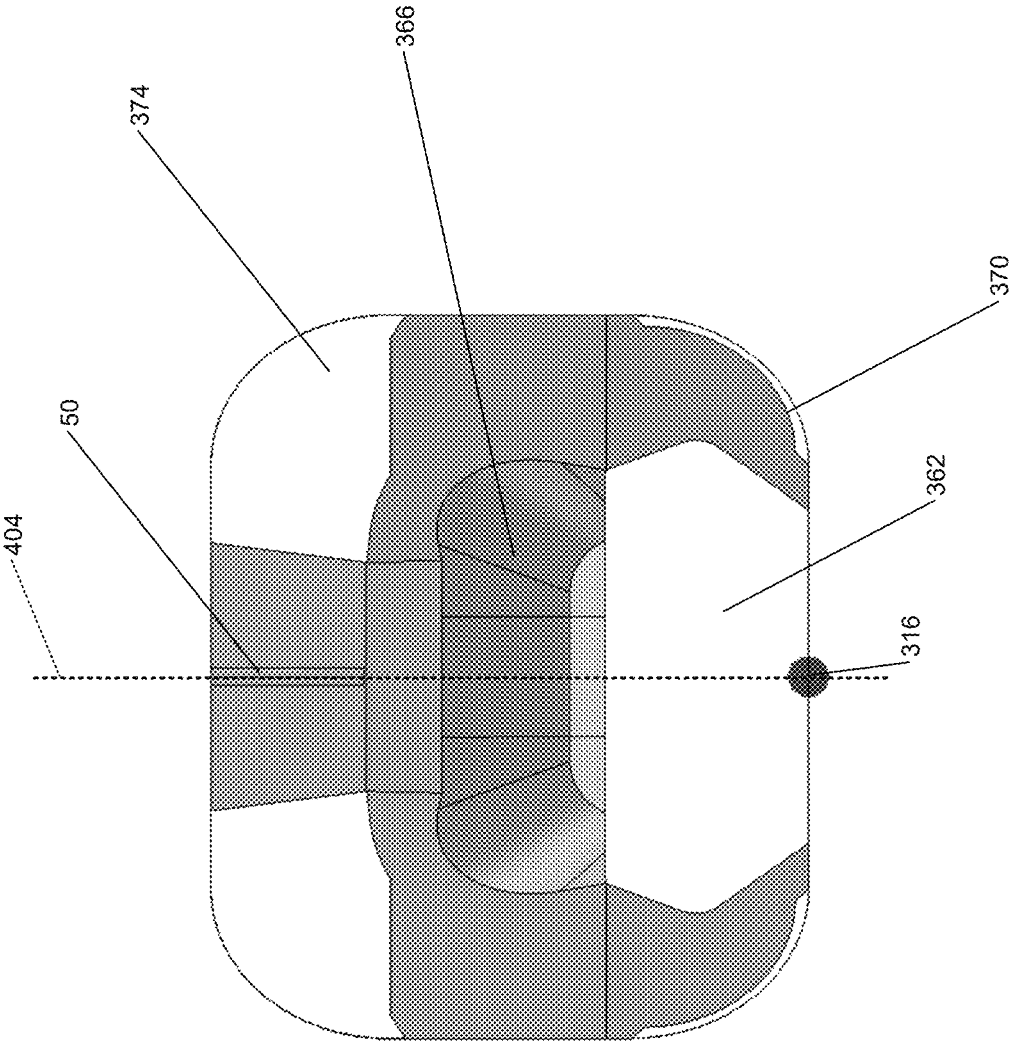
Figure 20:
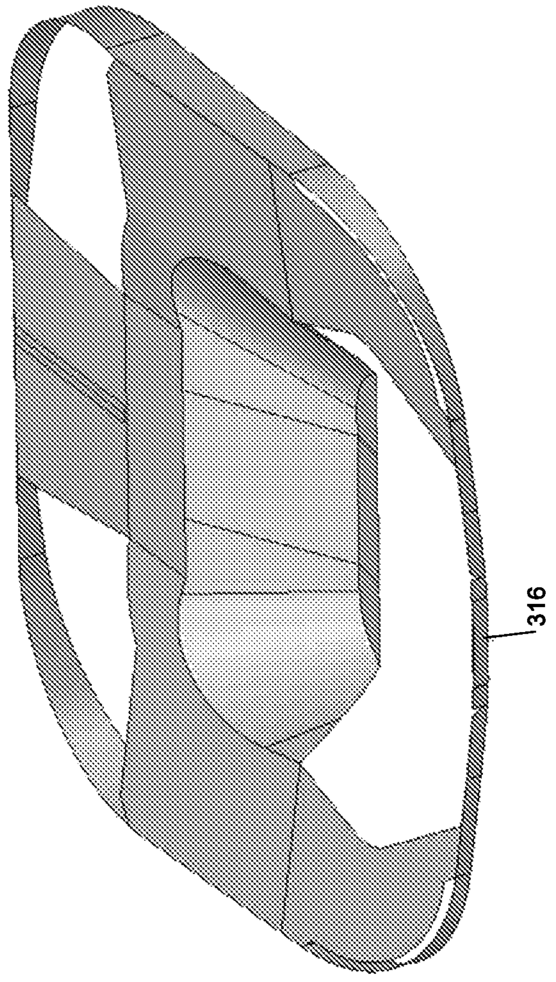
Figure 21:
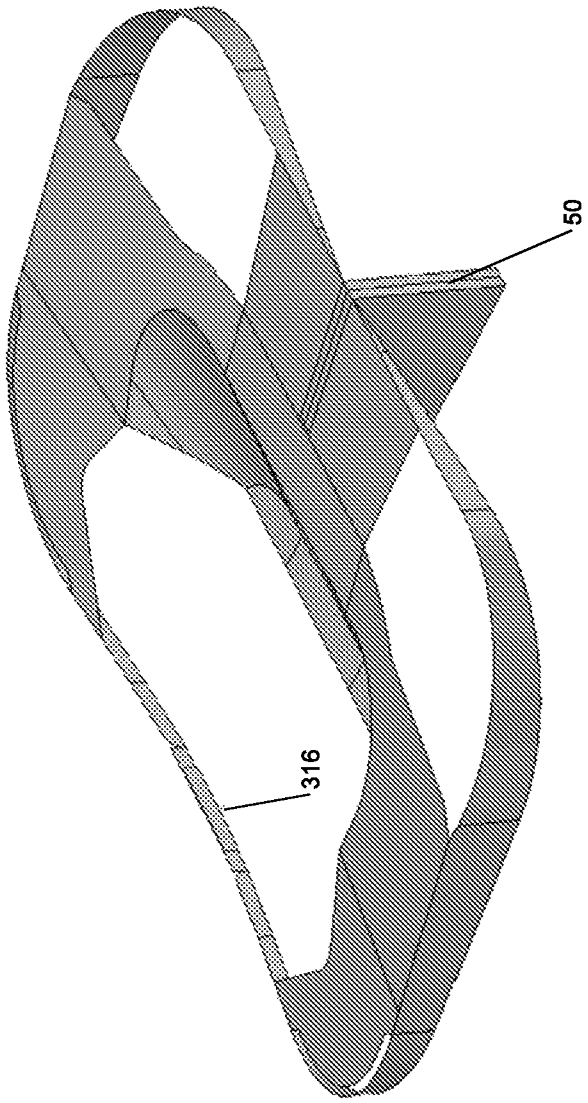

FIGS. 19-21 are example views of the UWB 300 without the first antenna 308 and without the filters 304. FIG. 19 is a top view of the example implementation of the UWB 300. FIG. 20 is a side perspective view of the example implementation of the UWB 300. FIG. 21 is a rear side perspective view of the example implementation of the UWB 300.

In this example, the distribution portion 320 is directly electrically connected to the second antenna 312 and the UWB 300 includes only the single antenna (the second antenna 312). As illustrated, the cap portion of the UWB 300 (including the first cap portions 350, the second cap portions 354, and the third cap portions 358) is a partial cap and includes the aperture 362 through the cap portion. The cap portion may also include the apertures 370. The cap portion may also include the apertures 374.

The tapered portion 366 that tapers vertically downwardly from the cap portion toward or to the ground plane 18. The connecting portion 50 extends from the end of the UWB 300 opposite the feed point 316 toward the center of the UWB 300. The apertures through the cap portion cover less than two-thirds of the surface area of the cap portion if the cap portion was a complete cap and filled the entire area within the tapered side portion 324, such as illustrated in the example of FIGS. 1A and 1B. At least a portion of the cap portion directly contacts the tapered side portion 324. In the example of FIGS. 19-21 portions of the first, second, and third cap portions 350, 354, and 358 contact the tapered side portion 324.

Figure 16:
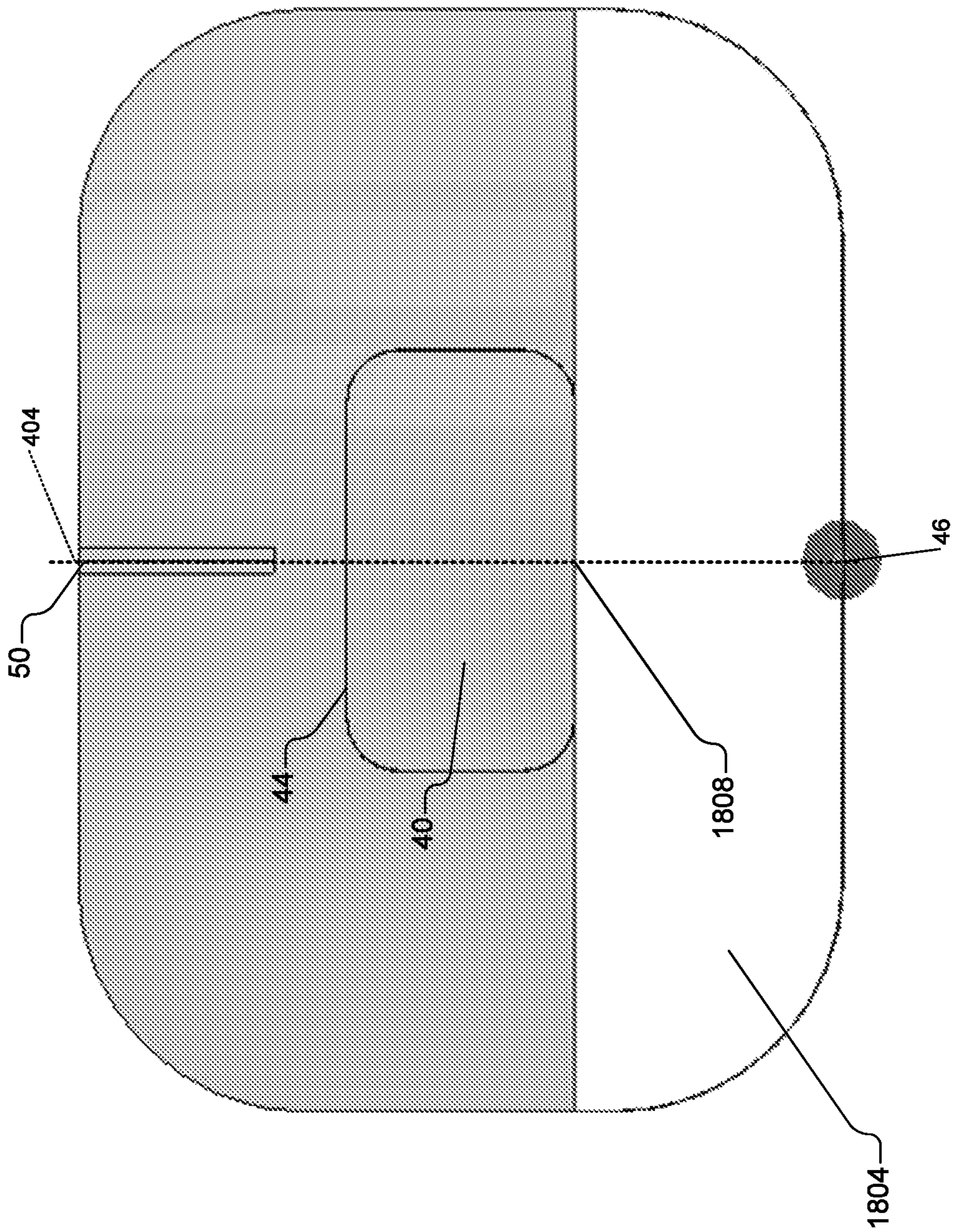
FIGS. 16-21 are example views of a UWB antenna.
Figure 17:
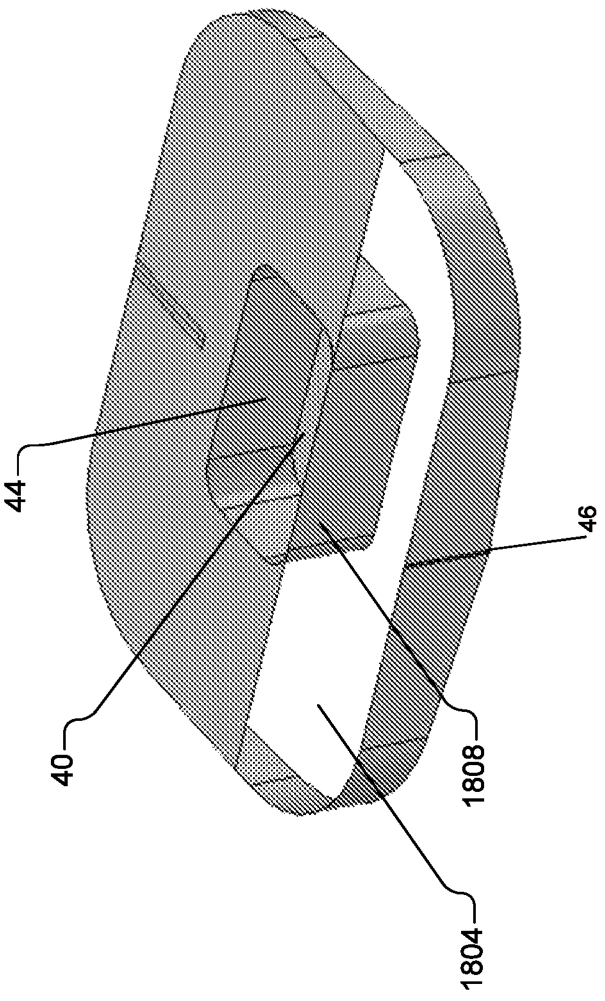
Figure 18A:
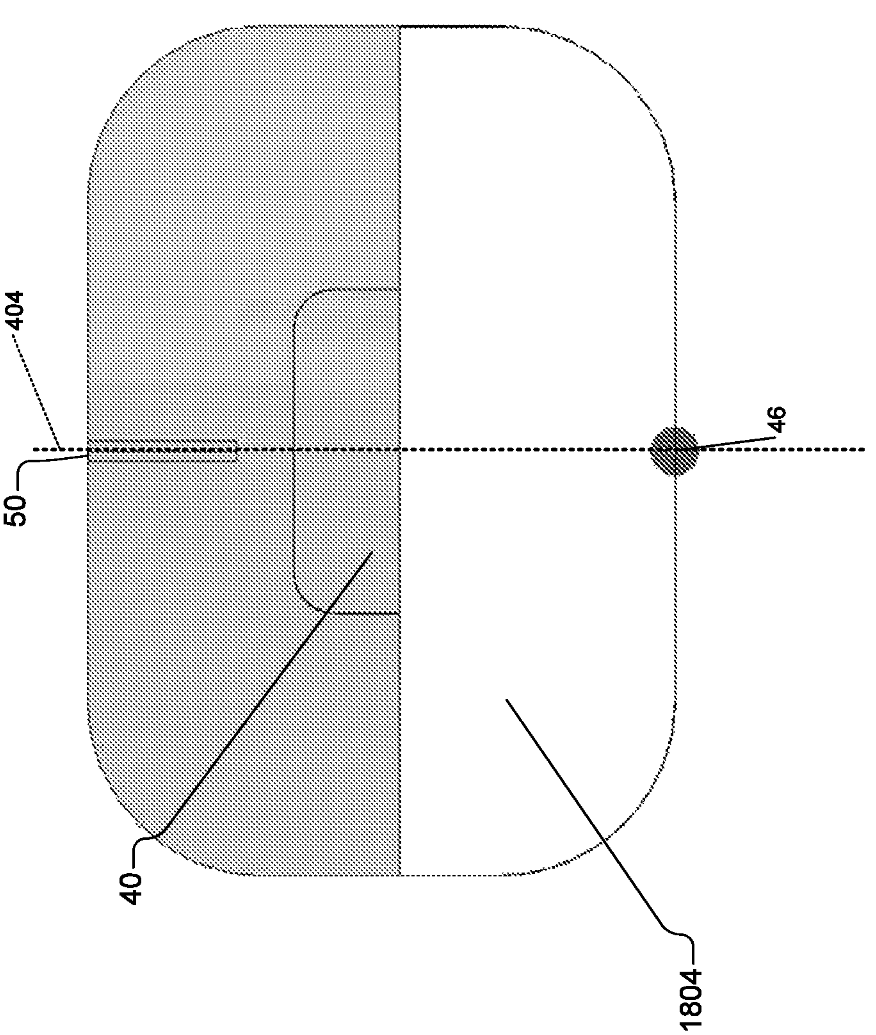
Figure 18B:
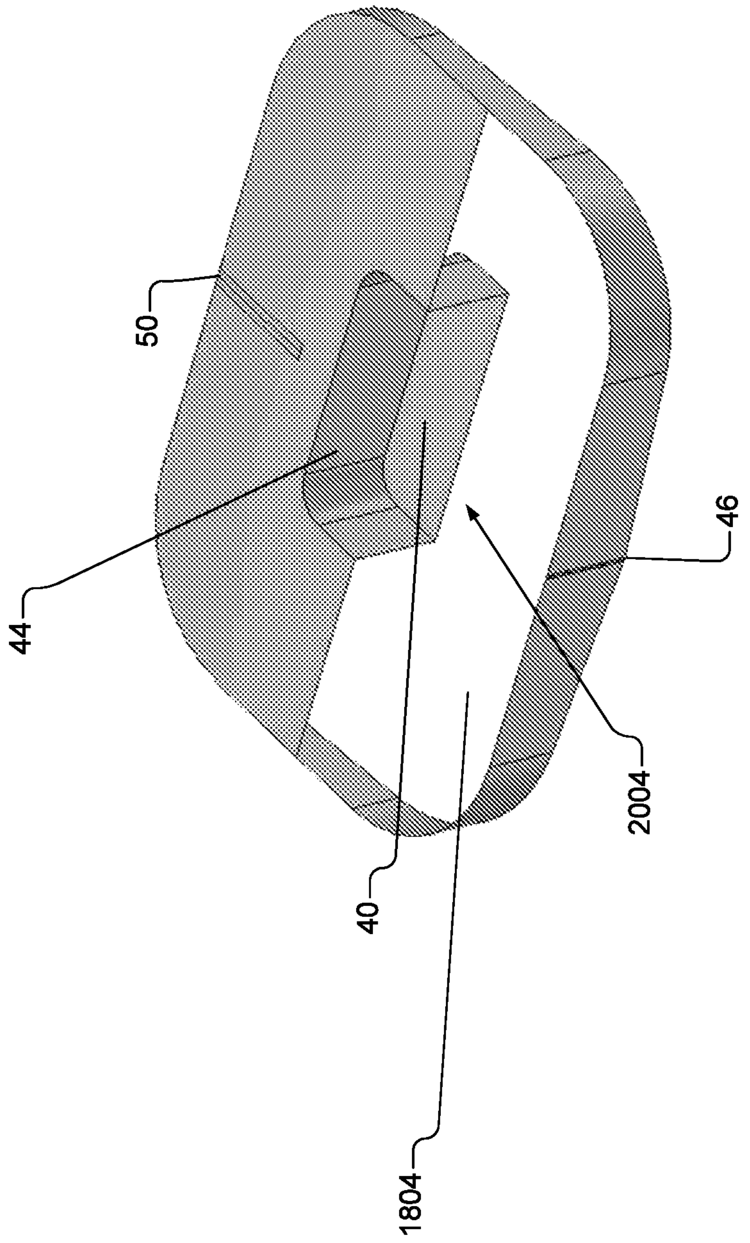

FIGS. 16, 17, and 18A-B are example views of the UWB 10 with a partial cap. FIG. 16 is a top view of the UWB 10. FIG. 17 is a side perspective view of the UWB 10. FIGS. 18A and 18B are top and side perspective views of the UWB 10. In this example, in addition to including the opening 40, the planar (cap) portion 20 of the UWB 10 may include an aperture 1804 through the planar portion 20.

As shown in the examples of FIGS. 16 and 17, the aperture 1804 may abut a feed side edge 1808 of the cylinder 44 closest to the feed 46. In various implementations, such as shown in the examples of FIGS. 18A and 18B, the aperture 1804 may truncate the opening 40 and the cylinder 44. In this example, a feed side 2004 of the cylinder 44 facing and closest to the feed 46 may be open and not defined by a wall of the cylinder 44. Features described above with respect to FIGS. 1-16 also apply to FIGS. 18-21.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. An ultra wide band (UWB) antenna, comprising:
a ground plane; and
an antenna body including:
a cap portion arranged above the ground plane;
a tapered side portion extending perpendicular to the cap portion in a direction toward the ground plane, wrapping at least 50% around an outer edge of the cap portion and tapering in height from a feed side of the antenna body in a direction towards a back side of the antenna body;
a cylinder connected to a bottom surface of the cap portion and to the ground plane;
a connecting portion connecting the back side of the cap portion, opposite the feed side, to the ground plane; and
an aperture through the cap portion disposed between the cylinder and the feed side of the antenna body.

2. The UWB antenna of claim 1, wherein the aperture abuts an edge of the cylinder that faces the feed side.

3. The UWB antenna of claim 1, wherein the cylinder includes a second aperture through the cap portion.

4. The UWB antenna of claim 1, wherein a height of the antenna body relative to the ground plane is equal to approximately $1/20$ of a wavelength corresponding to a lowest operating frequency of the UWB antenna.

5. The UWB antenna of claim 1, wherein the feed side of the tapered side portion has a first height and is spaced from the ground plane by a gap, wherein the back side of the tapered side portion has a second height that is less than the first height.

6. The UWB antenna of claim 5, wherein a height of the tapered side portion monotonically decreases from the first height to the second height.

7. The UWB antenna of claim 5, wherein the gap has a third height at the feed side of the tapered side portion and a fourth height at the back side of the tapered side portion, and
wherein the fourth height is greater than the third height.

8. The UWB antenna of claim 7, wherein a height of the gap monotonically increases from the third height to the fourth height.

9. The UWB antenna of claim 1, wherein the aperture is disposed closer to the feed side than to the back side.

10. The UWB antenna of claim 1, further comprising an antenna feed connected to a center of tapered side portion on the feed side.

11. The UWB antenna of claim 1 wherein a side wall of the cylinder is open to the aperture.

12. The UWB antenna of claim 1 wherein the aperture truncates the cylinder.

13. The UWB antenna of claim 1 wherein the cylinder includes a wall that tapers downwardly toward the feed side of the antenna body.

14. The UWB antenna of claim 1 wherein the antenna body is symmetrical about a line between (a) a first point on the feed side where an antenna feed connects to the feed side and (b) a second point on the back side where the connecting portion connects to the ground plane.

15. The UWB antenna of claim 14 wherein the cap portion includes:

first cap portions disposed on opposite sides of the line;

second cap portions disposed on opposite sides of the line; and third cap portions disposed on opposite sides of the line.

16. The UWB antenna of claim 15 wherein the third cap portions are planar and are parallel to the ground plane.

17. The UWB antenna of claim 15 wherein the first and second cap portions each include planar portions that are not parallel with the ground plane, wherein the planar portions of the first and second cap portions become further from the ground plane moving from the feed side of the antenna body toward the back side.

18. The UWB antenna of claim 15 further comprising second apertures through the first cap portions and disposed on opposite sides of the line.

19. The UWB antenna of claim 15 further comprising second apertures through the third cap portions and disposed on opposite sides of the line.

20. A vehicle comprising the UWB antenna of claim 1.

* * * * *